United States Patent
Adams (10) Patent No.: US 7,464,001 B1
(45) Date of Patent: Dec. 9, 2008

(54) METHOD OF IDENTIFYING AND RECORDING INSPECTION INFORMATION ON PERSONAL PROTECTIVE EQUIPMENT

(75) Inventor: Ronald W. Adams, Franklin, PA (US)

(73) Assignee: French Creek Production, Inc., Franklin, PA (US)

(*) Notice: Subject to any disclaimer, the term of this patent is extended or adjusted under 35 U.S.C. 154(b) by 229 days.

(21) Appl. No.: 11/224,612

(22) Filed: Sep. 12, 2005

Related U.S. Application Data (60) Provisional application No. 60/608,997, filed on Sep. 11, 2004.

(51) Int. Cl.
*G06F 15/00* (2006.01)
(52) U.S. Cl. ...................................... 702/183
(58) Field of Classification Search ................. 702/104, 702/116, 118, 119, 120, 121, 122, 182–184; 340/10.3, 870.17
See application file for complete search history.

(56) References Cited

U.S. PATENT DOCUMENTS

| | | | |
|---|---|---|---|
| 5,151,684 A | | 9/1992 | Johnsen |
| 5,461,807 A | | 10/1995 | Johnson |
| 5,712,630 A | * | 1/1998 | Nanboku et al. ........... 340/10.3 |
| 5,745,049 A | * | 4/1998 | Akiyama et al. ....... 340/870.17 |
| 5,952,935 A | * | 9/1999 | Mejia et al. ................ 340/10.3 |
| 6,144,301 A | | 11/2000 | Frieden |
| 6,486,781 B2 | | 11/2002 | Edwards et al. |
| 2003/0061005 A1 | * | 3/2003 | Manegold et al. ........... 702/182 |
| 2003/0189488 A1 | | 10/2003 | Forcier et al. |
| 2004/0092311 A1 | * | 5/2004 | Weston et al. .................. 463/42 |
| 2004/0176872 A1 | * | 9/2004 | Eidemiller ................... 700/225 |
| 2004/0257203 A1 | * | 12/2004 | Maltsev et al. ............. 340/10.1 |
| 2005/0012596 A1 | * | 1/2005 | Wennrich et al. .......... 340/10.3 |

OTHER PUBLICATIONS

"Web pages from Socket Communications, Inc.", Socket Reader Development Kit,(Aug. 9, 2005),4.
"Web pages from Transponder News", (Oct. 4, 2005),19.

* cited by examiner

*Primary Examiner*—Edward Raymond
*Assistant Examiner*—Mohamed Charioui
(74) *Attorney, Agent, or Firm*—Jonathan M. D'Silva; Edward W. Goebel, Jr.; MacDonald Illig Jones & Britton LLP (57) ABSTRACT

A method of organizing personal protective equipment (PPE) testing/inspection records comprising: securely fastening transponders having a read/write capability on items of PPE that require periodic testing/inspections; providing at least one scanner that can activate the transponders and read, record, and process information received from the activated transponders, and electronically write information on the activated transponders; providing a computerized database for storing and organizing information from installed transponders; providing a computerized interface program that interfaces with the scanner and the computerized database; using at least one scanner to write in a read-only format appropriate initial information on installed transponders which identifies each item of PPE and to write inspection information in a read/write format on installed transponders; and using the computerized interface program to initialize the computerized database with initial information from installed transponders with information as written and read by the scanner.

27 Claims, 4 Drawing Sheets

METHOD OF IDENTIFYING AND RECORDING INSPECTION INFORMATION ON PERSONAL PROTECTIVE EQUIPMENT

This application takes priority from U.S. provisional application 60/608,997 filed Sep. 11, 2004, which is incorporated herein by reference.

BACKGROUND

Regulatory standards such as those of the Occupational Safety and Health Administration ("OSHA") and non-regulatory standards such as those of the American National Standards Institute ("ANSI") require that personal protective equipment, including personal fall arrest equipment, be periodically inspected and maintained. As a result of these standards personal fall arrest equipment and other types of personal protective equipment include labeling and markings identifying the equipment and its inspection history. Inspection agencies, such as OSHA, strongly recommend that businesses using personal protective equipment create, maintain and use inspection logs for this equipment.

By way of example personal fall arresting equipment is often labeled and marked through the use of physical tags that have information identifying the equipment and its inspection history written or otherwise inscribed on them in either a human readable or bar code format. In either case, these tags can become illegible over time due to environmental conditions in which the fall arrest equipment is used or due to a lack of care of this equipment. As a result, these tags can become useless for the purpose of identifying specific items of personal fall arrest equipment and their inspection history. Thus, inadequacies of current labeling practices adversely affect the ability of users of personal protective equipment to quickly and positively identify individual items of this equipment as required for inspection, maintenance, security and record keeping.

Radio Frequency Identification Device ("RFID") technology has been developed in recent years and used for many purposes. Systems based on RFID technology use small, inexpensive identification tags that are transponders having antenna that receive radio frequency signals from a scanner and in response transmit stored data that are received by the scanner. Data can be stored on transponders in a "read-only" format that cannot be changed by the scanner, or in a "read/write" format that can be received and changed by a scanner on a transponder, or data can be stored in both formats. RFID devices are also used with computerized databases that store information relating to items with which the RFID systems are used and receive and process related information from the scanner.

SUMMARY

A method is provided of organizing inspection records for individual items of personal protective equipment that require periodic testing and/or inspection. Each of a plurality of items of personal protective equipment requiring periodic inspections is provided with an RFID transponder. In one embodiment of the invention the transponders have the capability of storing information in a format that can only be read (read-only format) and in a format that can be both read and also erased and written over with new information (read/write format). Each transponder is securely fastened on its respective item of personal protective equipment. Each transponder has information identifying the item of personal protective equipment on which it is installed written on it in read-only format. Each transponder also has the capacity to receive in read/write format information relating to the person authorized to use the item of personal protective equipment on which it is installed and regarding periodic inspections of that equipment. At least one RFID scanner is provided that can transmit signals to activate the transponders and record and process information then being transmitted from the transponders. The scanner can also transmit and write to the transponders information that is in read/write format, including information relating to the inspection of personal protective equipment on which a transponder is installed.

A computerized database is also provided for receiving and storing identifying information and inspection information regarding each of the items of personal protective equipment on which transponders are installed. At least one scanner is interconnected with the database through a computerized interface program to enable inspection information for items of personal protective equipment to be transmitted between the transponders and the database. The interface program also enables the user to provide instructions to the scanners and can also be used to search the database and generate inspection reports and summaries.

Prior to using the personal protective equipment, authorized users can also use scanners to read the imbedded transponders to ensure that the equipment has passed inspection.

DETAILED DESCRIPTION

Referring to the drawings, similar reference numerals and letters may be used to designate the same or corresponding parts throughout the several embodiments and figures. Specific embodiment variations in corresponding parts are noted by the addition of lower case letters next to reference numerals. While the method of this invention can be used with any type of personal protective equipment, such as respirators, hard hats, flotation equipment, fire suppression equipment, first aid kits, personal armor, safety goggles, etc., it is being explained with respect to personal fall arrest equipment such as a full body harness 10 shown in FIG. 1.

Figure 1:
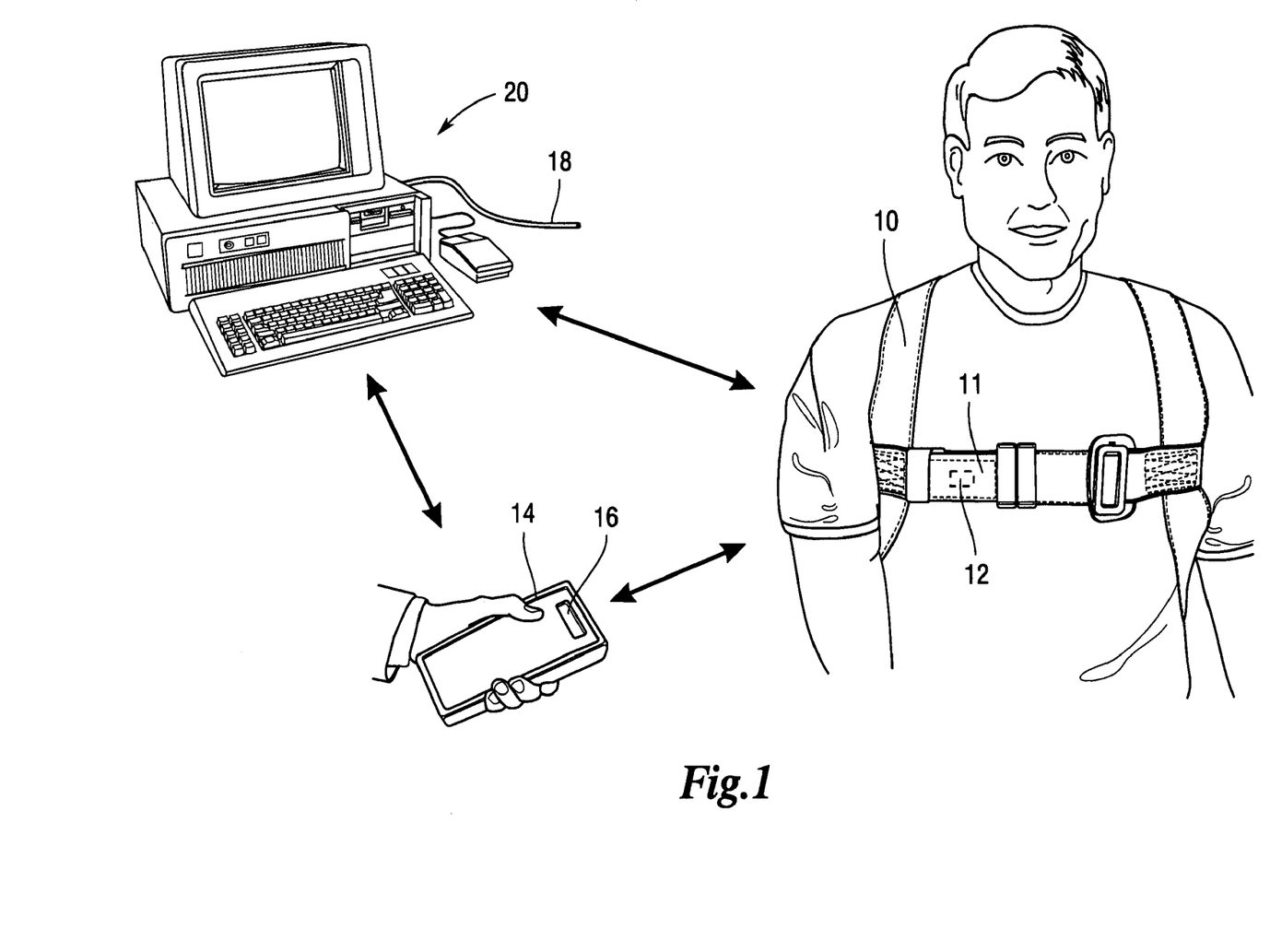
FIG. 1 shows a full body harness used in accordance with one embodiment.

Fall arrest equipment such as full body harness 10 is worn to stop a possible fall of a worker who is wearing it and to protect that worker from serious injury or death resulting from the fall. Because of the critical safety function of this type of personal protective equipment, each full body harness 10 is typically assigned to one person. That person is required to inspect it daily. Because he or she is the only one using it, that person knows the history of its use, any stress or damage it has incurred and any maintenance it may require. Additionally, personal fall arrest equipment such as the full body harness 10 must be fully inspected by trained safety personnel twice a year. Thus the full body harness 10 and other critical fall arrest equipment, such as body belts, lanyards, life lines, retractable life lines, shock absorbers, anchors and anchor connectors should be able to be specifically identified and distinguished from identical pieces of fall arrest equipment for the purposes of possible assignment to individuals and for inspection and record keeping purposes.

According to one embodiment, when personal protective equipment such as a full body harness 10 is manufactured it is integrated into an RFID system that utilizes RFID transponders having the capability of storing information for use by a customer in both a read-only format and read/write format. A transponder 12 is securely fastened to material used to construct the full body harness 10 so that it is unlikely to become detached from the personal protective equipment during normal use and does not interfere with the equipment's proper use and function. One method of securely fastening the transponder 12 to the full body harness 10 is by attaching the transponder 12 substantially permanently to the full body harness 10 so that it must be significantly altered or destroyed to remove. As shown in FIG. 1, the transponder 12 is embedded within a segment 11 of the full body harness 10 by being sewn between adjacent cloth layers of the segment 11. The segment 11 would have to be cut open to remove the transponder 12 thereby substantially altering or destroying the harness 10. The transponder could also be attached to the personal protective equipment with other types of fasteners such as pins, clasps, staples, etc. Adhesives could also be used to attach transponders to personal protective equipment.

One transponder that was found to be satisfactory for use as the transponder 12 was model number RF-HDT-DVBB-NO manufactured by Texas Instruments Company. It is a 13.56 MHz encapsulated transponder that is compliant with ISO 15693 standard. Compliance with this standard requires that information arrays be of a certain size. The information on this transponder is organized in arrays that are tab delimited. When used according to one embodiment, this enables a supplier of fall arrest equipment to choose which information is stored at various locations on the transponder and how the information is arranged. Other transponders having similar characteristics can be substituted for the transponder chip identified above.

An RFID reader or scanner 14 must be chosen that is compatible with the transponder 12. A scanner used by the manufacturer of the full body harness 10 should be programmed to write the equipment identifying information on the transponder 12 installed on the full body harness 10. This can be accomplished with the computerized interface program as discussed below. According to one embodiment, scanners sold to customers who wear the full body harness 10 should be programmed to have the capability of only reading the equipment identifying information in the format in which it is written. The scanners sold to customers should have the ability to both read and write the user/inspection information.

The scanner 14 generates radio frequency waves and a magnetic field. When the scanner is brought in proximity to an area that includes an antenna on the transponder, the transponder 12 generates power from the magnetic field and uses this power to energize circuits within the transponder. The transponder 12 then sends information back to the scanner 14 in the form of radio frequency waves. The scanner 14 converts the radio frequency waves into digital data representing the information that was transmitted from the transponder 12. The scanner 14 should have the capacity to process that information for storage and display by itself and/or by a computer used in association with the RFID system. Preferably, the scanner 14 can be used alone on the job to check the information written on the transponder 12 of the fully body harness 10 and written on the transponders installed in the other personal protective equipment with which it is used. It should also have the capability of communicating with a computerized interface program that interfaces with a computer database for compiling the information stored on the transponder 12. The interface program can be built into the scanner 14 and the combination scanner and interface program can have an appropriate data input device to enable the scanner to write or change the information written on the transponder 12 in a read/write format. The interface program could also be installed on a desktop computer or a handheld computer.

In the preferred embodiment, the scanner 14 includes a screen 16 that can display information received from the transponder 12. An example of a scanner that can be used for this purpose is a portable, hand-held RFID scanner model number HI-232 manufactured by SkyeTek, Inc. of Bolder, Colo. This scanner is portable and includes a cable 18 that enables it to be attached to a computer 20 with respect to which it may be used. It will be appreciated that some scanners that would also be suitable are able to communicate with computers through means other than a cable such as wirelessly or through a docking station. The scanner could also be a plug-in attachment to a handheld computer, in which case the scanner would not be equipped with a screen and the handheld computer would display the scanner readings.

Figure 2:
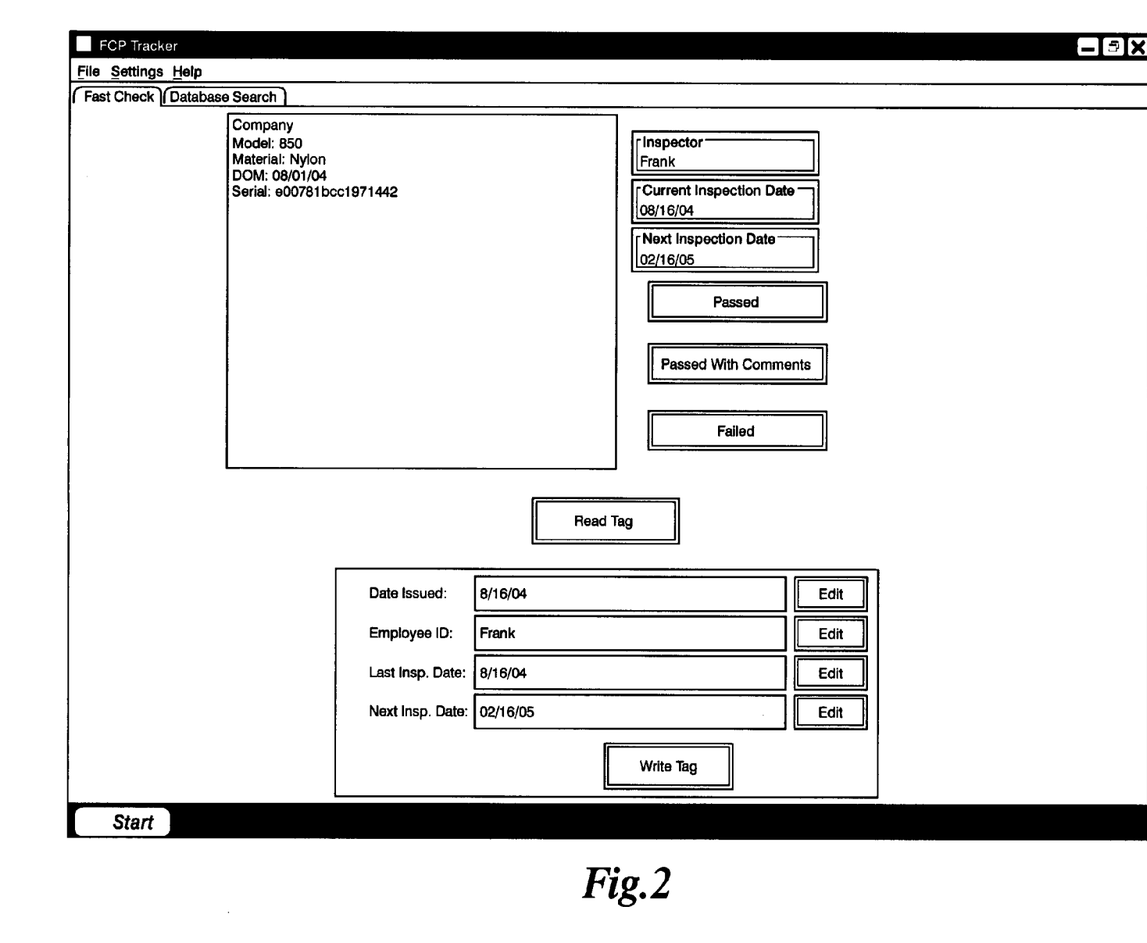
FIG. 2 depicts a computer screen showing samples of data that can be read from or written onto transponder tags used in accordance with one embodiment
Figure 3:
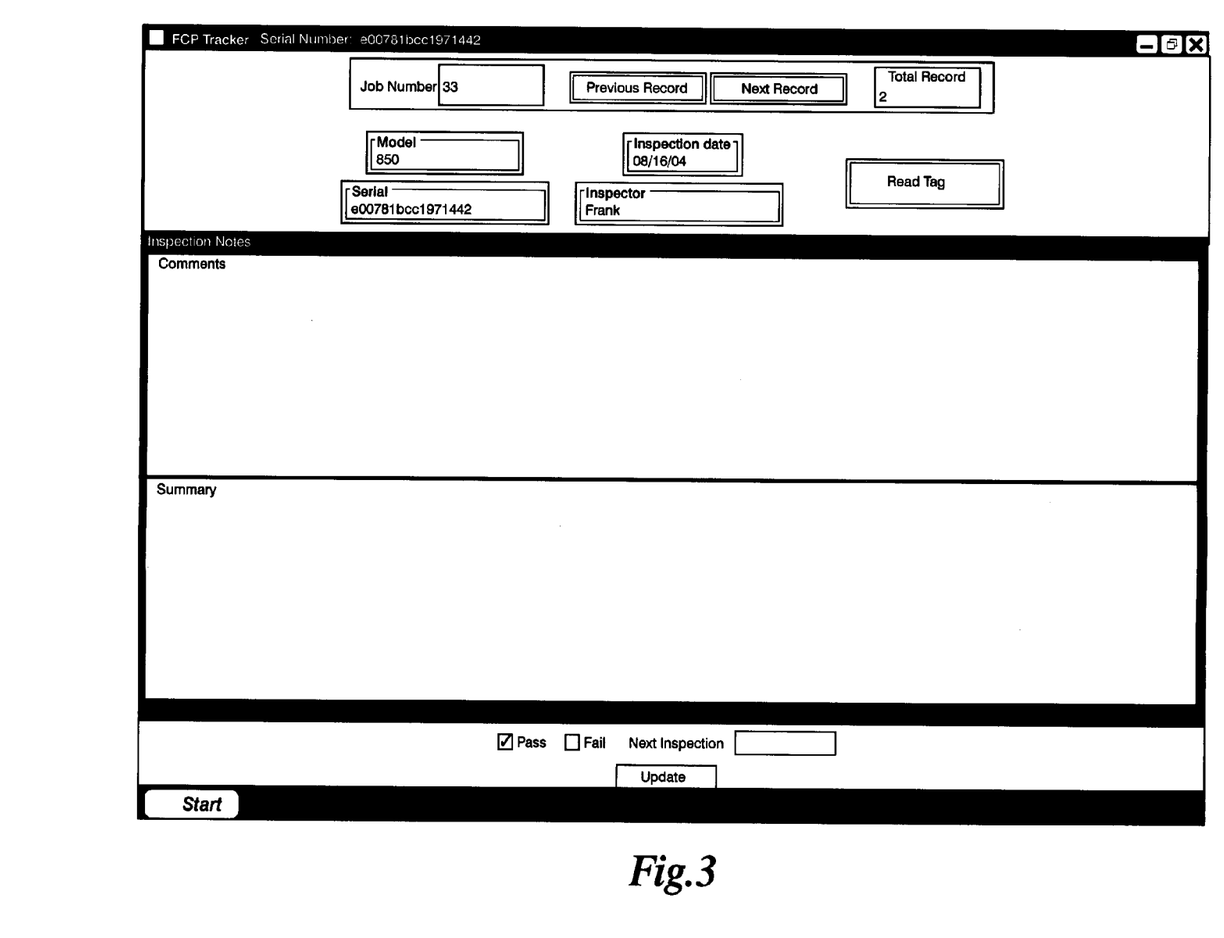
FIG. 3 depicts a computer screen showing one type of supplementary information that can be entered into a database used in accordance with one embodiment.

A computerized database is provided for receiving and storing identifying information and inspection information regarding each of the items of personal protective equipment on which a transponder is installed. In the preferred embodiment, a Microsoft Access database is created to store and sort information into specific fields. These fields can be manipulated to give pertinent information back to the user of the system. The database is updated with new information and is only limited in size or range of capabilities with the memory allocated on the computer. This information can be printed out or shown on a computer screen set up in any manner desired via the interface program, such as depicted on the computer screens in FIGS. 2 and 3.

The interface program communicates with the database using standard software (drivers) usually available from the database software developer. In the preferred embodiment, the interface program communicates with the Microsoft Access database by Java Open DataBase Connectivity ("ODBC") drivers.

The interface program communicates with the scanners using standard drivers usually available from the scanner manufacturer. In the preferred embodiment the scanner drivers were Java libraries obtained from the scanner manufacturer, SkyeTek, Inc. and integrated into the interface program using the RFID HF-1 Midrange Getting Started Introductory Evaluation Kit P-8237 purchased from Dynasys of Clearwater, Fla.

The interface software would enable the supplier of the full body harness 10 to set up the scanner for use by its customers in connection with the full body harness 10 and its transponder 12. In the preferred embodiment, the interface software is written in Java Runtime.

Figure 4:
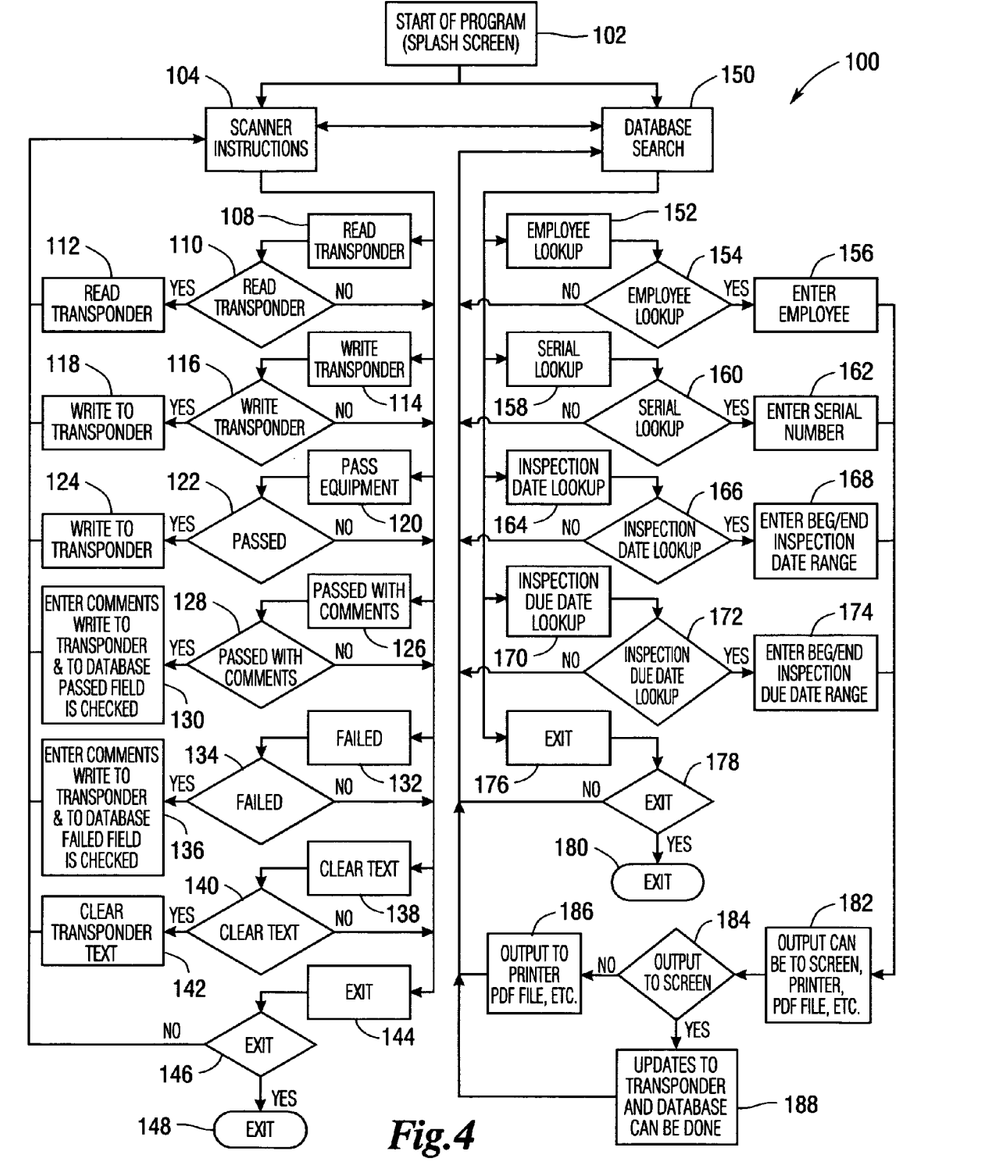
FIG. 4 shows a sample flowchart of some of the possible functions that could be incorporated into the computer interface program in accordance with one embodiment.

FIG. 4 depicts a flowchart 100 that outlines some of the features of the interface program. Those of skill in the art will appreciate that not every depicted feature is necessary for the interface program to perform its function and that additional features may be added or removed as required without limiting the scope of the invention.

In the preferred embodiment, the interface program is installed on a desktop computer. Referring to FIG. 4, when the interface program is executed a splash screen 102 is displayed that announces to the user that the interface program is being loaded. The user is then given the option of accessing "scanner instructions" 104 or accessing the "database search" 150. If the user selects the "scanner instructions" option 104 the interface program will provide a list of a variety of functions the scanner could perform. If the user selects the "database search" option 150 the interface program will provide a list of options to search stored inspection records in the database.

In the preferred embodiment during the initial setup of the RFID system, the user selects the "scanner instructions" option 104 and is provided with a list of scanner functions that can be performed. The user selects "read transponder" option 108 to confirm the installation of a transponder in an item of personal protective equipment. The interface program will provide a prompt 110 to confirm that selection before the interface program will instruct the scanner 112 to read transponders or return the user to scanner instructions options list. The user will then use the scanner to read a transponder securely fastened to an item of personal protective equipment. After confirming the transponder is not in the database, the user then selects the "write transponder" option 114. The interface program will provide a prompt 116 to confirm that selection before the interface program will instruct the scanner 118 to write the initial identification information to the transponders in read-only format or return the user to scanner instructions options list. After the initial identification information has been written to the transponder the user will typically conduct the initial inspection of the personal protective equipment. If the equipment passes the initial inspection, the user selects the "pass equipment" option 120 to write to the transponder that the equipment has passed inspection. The interface program will provide a prompt 122 to confirm that selection before the interface program will instruct the scanner 124 to write the initial pass inspection information to the transponders in read/write format or return the user to scanner instructions options list.

In the preferred embodiment, when it is time for the scheduled inspection and/or testing of the personal protective equipment, the user selects the "scanner instructions" option 104 and is provided with a list of scanner functions that can be performed. The user selects "read transponder" option 108 to confirm the identity of the equipment. The interface program will provide a prompt 110 to confirm that selection before the interface program will instruct the scanner 112 to read transponders or return the user to scanner instructions options list. After confirming that the equipment is scheduled for inspection and/or testing, the user will perform such scheduled inspection and/or testing. If the equipment passes inspection and/or testing, the user selects the "pass with comments" option 126. The interface program will provide a prompt 128 to confirm that selection before the interface program will instruct the scanner 130 to allow the user to write comments to the transponder in read/write format and update the database or return the user to scanner instructions options list. If the equipment fails inspection and/or testing, the user selects the "failed" option 132. The interface program will provide a prompt 134 to confirm that selection before the interface program will instruct the scanner 136 to allow the user to write comments to the transponder in read/write format and update the database or return the user to scanner instructions options list. In the preferred embodiment, the interface program also has a "clear text" option 138. If the user selects this option, the interface program will provide a prompt 140 to confirm that selection before the interface program will instruct the scanner 142 to erase all information on the transponder or return the user to scanner instructions options list.

The user also has the option to exit the interface program 144. If the user selects this option the interface program will provide a prompt 146 to confirm that selection before the interface program will instruct interface program 148 to end or return the user to the scanner instructions options list.

In the preferred embodiment, if the user selects "database search" option 150 the interface program will provide a list of options to search inspection records stored in the database. If the user selects the "employee lookup" option 152, the interface program will provide a prompt 154 to confirm this selection before the interface program will provide another prompt 156 for the user to enter the employee name or identification number to search the database or return the user to the database search options list. If the user selects the "serial lookup" option 158, the interface program provide a prompt 160 to confirm this selection before the interface program will provide another prompt 162 for the user to enter the equipment serial number to search the database or return the user to the database search options list. If the user selects the "inspection date lookup" option 164, the interface program will provide a prompt 166 to confirm this selection before the interface program will provide another prompt 168 for the user to enter the range of inspection dates to search the database or return the user to the database search options list. If the user selects the "inspection due date lookup" option 170, the interface program will provide a prompt 172 to confirm this selection before the interface program will provide another prompt 174 for the user to enter the range of inspection due dates to search the database or return the user to the database search options list.

When the interface program has completed a search the user is provided with the option to select where the results are presented 182. If the user selects a screen output, the interface programs provides a prompt 184 to confirm the selection and the search results are output to the computer screen 188 where the user can also make changes to the information stored on the database. If the user does not want the search results output to the computer screen, the user is provided with options 186 to send the output to a printer or convert the output into another software format. The user also has the option to exit the interface program 176. If the user selects this option the interface program will prompt the user to confirm that selection 178 before the interface program will instruct the interface program to exit 180 or return the user to the database search options list.

In another embodiment the interface program could be programmed to link various database fields to generate reports based on the search criteria.

Another option is to have the database and/or the interface program encrypted or password-protected to limit access to only authorized users. In this embodiment the scanners could still read or write to the transponder but any modification to the stored data would be noted as a discrepancy in the database. This would serve as an additional security and safety measure.

In still another embodiment the interface program can be used create inspection-planning criteria and generate in-depth and historical logs of all personal protective equipment. A further option is to have the interface program enable its users to tailor their inspection regimen by the job required or the environment that the equipment is in. By linking various fields in the database, the interface program will allow the user to plan on when to take equipment out of service, when it is due for inspection, or to plan for future purchases of new equipment.

While the interface program chosen for the preferred embodiment is supported by the Java language and has Java libraries, an interface program could have been chosen that is supported by C++ or Visual Basic or other appropriate programming language and corresponding libraries. A database in Oracle or Mysol or some other available database could have been chosen, rather than Microsoft Access.

According to the preferred embodiment the personal protective equipment with the installed transponders in normal use is periodically inspected as required or recommended by safety considerations. The inspector of the personal protective equipment uses the scanner 14 to access the installed transponder 12 and identify the equipment being inspected. At the completion of appropriate inspection protocols, the inspector again accesses the transponder 12 and writes the results of the inspection to the transponder 12. The interface program updates the computerized database with the inspection results. The end user of the personal protective equipment is able to access the inspection results by using the scanner 14 to read the information stored on the transponder 12.

In another embodiment the transponders 12 have the capability of storing information in only a read-only format. In this case the transponders 12 securely fastened in the personal protective equipment are initialized with identifying information in a read-only format. As there is no capability to add more information, the transponders 12 are used for identification purposes only. At least one scanner 14 is provided that can transmit signals to activate the transponders and record and process information then being transmitted from the transponders 12. The inspector will use the scanner 14 to access the transponder 12 and identify the equipment, and then use the interface program to add the inspection results, comments, etc. in the database information fields specific to the personal protective equipment associated with the identified transponder 12.

In another embodiment it is also possible to reuse the transponder 12 at the end of the useful life of the full body harness 10 by removing the transponder 12 from the segment 11 and securely fastening it to another item of personal protective equipment. The scanner 14 would then be used to erase any erasable information from the transponder 12 and re-initialize the transponder 12 with new identification information specific to the item of personal protective equipment the transponder 12 is installed on. The user would then direct the interface program to update the database with the new information.

Those skilled in the art will recognize that the various features of this invention are capable of embodiments that are different from those shown and described above. Accordingly, the drawings and description ought to be regarded as illustrative in nature and are not to restrict the scope of this invention. Thus, appended claims are to be regarded as including such equivalence as do not depart from the spirit and scope of this invention.

The invention claimed is:

1. A method of organizing personal protective equipment testing and/or inspection records comprising:
    selecting a plurality of items of personal protective equipment that requires periodic testing and/or inspections;
    selecting a plurality of transponders, each transponder having a read/write capability;
    securely fastening a transponder on each item of personal protective equipment;
    providing at least one first scanner that can activate the transponders and read information from the activated transponders, record and process information received from the activated transponders, and electronically write information on the activated transponders;
    providing a computerized database for storing and organizing information from transponders installed on items of personal protective equipment;
    providing a computerized interface program that interfaces with said at least one first scanner and the computerized database to program said at least one first scanner to read from and/or write to each transponder and to revise recorded information in the database, so as to enable the use of said at least one first scanner to write in a read-only format appropriate initial information on transponders installed on items of personal protective equipment which identifies each item of personal protective equipment on which the transponder is installed and to write inspection information in a read/write format on transponders installed on items of personal protective equipment, and so as to enable the use of the computerized interface program to input initial information to the computerized database from each transponder installed on an item of personal protective equipment.

2. The method of claim 1 wherein the transponders are substantially permanently installed on the items of personal protective equipment.

3. The method of claim 1 further comprising:
    detaching a transponder previously securely fastened on a first item of personal protective equipment;
    using said at least one first scanner to remove all inspection and identification information recorded on the transponder;
    selecting a second item of personal protective equipment;
    securely fastening the detached transponder on the second item of personal protective equipment;
    using said at least one first scanner to write in a read-only format appropriate initial information on the transponder installed on the second item of personal protective equipment which identifies the second item of personal protective equipment on which the transponder is installed and to write inspection information in a read/write format on the transponder installed on the second item of personal protective equipment; and
    using the computerized interface program to input initial information to the computerized database from the transponder installed on the second item of personal protective equipment.

4. The method of claim 1 further comprising:
    performing periodic testing and/or inspections of the personal protective equipment; and
    using said at least one first scanner to read, record, and process information from transponders installed on items of personal protective equipment relating to periodic testing and/or inspections.

5. The method of claim 1 further comprising:
    performing periodic testing and/or inspections of the personal protective equipment;
    using said at least one first scanner to read, record, and process information from transponders installed on items of personal protective equipment relating to periodic testing and/or inspections; and
    using said at least one first scanner to write information to transponders installed on items of personal protective equipment relating to periodic testing and/or inspections.

6. The method of claim 1 further comprising:
    performing periodic testing and/or inspections of the personal protective equipment;
    using said at least one first scanner to read, record, and process information from transponders installed on items of personal protective equipment relating to periodic testing and/or inspections;
using said at least one first scanner to write information to transponders installed on items of personal protective equipment relating to periodic testing and/or inspections; and
using the computerized interface program to transfer to the computerized database the information read, recorded, processed, and/or written by a first scanner from transponders installed on items of personal protective equipment relating to periodic testing and/or inspections.

7. The method of claim 1 further comprising:
performing periodic testing and/or inspections of the personal protective equipment;
using said at least one first scanner to read, record, and process information from transponders installed on items of personal protective equipment relating to periodic testing and/or inspections;
using said at least one first scanner to write information to transponders installed on items of personal protective equipment relating to periodic testing and/or inspections;
using the computerized interface program to transfer to the computerized database the information read, recorded, processed, and/or written by a first scanner from transponders installed on items of personal protective equipment relating to periodic testing and/or inspections; and
using the computer interface program to manually update the computerized database.

8. The method of claim 1 further comprising:
performing periodic testing and/or inspections of the personal protective equipment;
using said at least one first scanner to read, record, and process information from transponders installed on items of personal protective equipment relating to periodic testing and/or inspections;
using said at least one first scanner to write information to transponders installed on items of personal protective equipment relating to periodic testing and/or inspections;
using the computerized interface program to transfer to the computerized database the information read, recorded, processed, and/or written by a first scanner from transponders installed on items of personal protective equipment relating to periodic testing and/or inspections; and
using the computerized interface program to generate testing and/or inspection summaries and reports from the computerized database.

9. The method of claim 1 further comprising:
performing periodic testing and/or inspections of the personal protective equipment;
using said at least one first scanner to read, record, and process information from transponders installed on items of personal protective equipment relating to periodic testing and/or inspections; and
using said at least one first scanner to write information to transponders installed on items of personal protective equipment relating to periodic testing and/or inspections; and
using said at least one first scanner to read information from transponders installed on items of personal protective equipment before the personal protective equipment can be used.

10. The method of claim 1 further comprising:
performing periodic testing and/or inspections of the personal protective equipment;
using said at least one first scanner to read, record, and process information from transponders installed on items of personal protective equipment relating to periodic testing and/or inspections; and
using said at least one first scanner to write information to transponders installed on items of personal protective equipment relating to periodic testing and/or inspections;
providing at least one second scanner that can at least activate the transponders and read information received from the activated transponders; and
using said at least one second scanner to read information on transponders installed on items of personal protective equipment before the personal protective equipment can be used.

11. A method of organizing personal protective equipment testing and/or inspection records comprising:
selecting a plurality of items of personal protective equipment that requires periodic testing and/or inspections;
selecting a plurality of transponders, each transponder having a read/write capability;
securely fastening a transponder on items of personal protective equipment;
providing at least one first scanner that can activate the transponders and read information from the activated transponders, record and process information received from the activated transponders, and electronically write information on the activated transponders;
providing a computerized database for storing and organizing information from transponders installed on items of personal protective equipment;
providing a computerized interface program that interfaces with said at least one first scanner and the computerized database to revise recorded information in the database and to program said at least one first scanner to read from and/or write to each transponder;
using said at least one first scanner to write in a read-only format appropriate initial information on transponders installed on items of personal protective equipment which identifies each item of personal protective equipment on which the transponder is installed;
using the computerized interface program to input initial information to the computerized database from each transponder installed on an item of personal protective equipment; and
providing at least one second scanner that can activate the transponders and read, record, and process information received from the activated transponders.

12. The method of claim 11 wherein the transponders are substantially permanently installed on items of personal protective equipment.

13. The method of claim 11 further comprising:
detaching a transponder previously securely fastened on a first item of personal protective equipment;
using said at least one first scanner to remove all inspection and identification information recorded on the transponder;
selecting a second item of personal protective equipment;
securely fastening the detached transponder on the second item of personal protective equipment;
using said at least one first scanner to write in a read-only format appropriate initial information on the transponder installed on the second item of personal protective equipment which identifies the second item of personal protective equipment on which the transponder is installed; and using the computerized interface program to input initial information to the computerized database from the transponder installed on the second item of personal protective equipment.

14. The method of claim 11 further comprising:
performing periodic testing and/or inspections of the personal protective equipment; and
using said at least one second scanner to read, record, and process information from transponders installed on items of personal protective equipment relating to periodic testing and/or inspections.

15. The method of claim 11 further comprising:
performing periodic testing and/or inspections of the personal protective equipment;
using said at least one second scanner to read, record, and process information from transponders installed on items of personal protective equipment relating to periodic testing and/or inspections; and
using the computerized interface program to transfer to the computerized database the information read, recorded, and processed by said a least one second scanner from transponders installed on items of personal protective equipment relating to periodic testing and/or inspections.

16. The method of claim 11 further comprising:
performing periodic testing and/or inspections of the personal protective equipment;
using said at least one second scanner to read, record, and process information from transponders installed on items of personal protective equipment relating to periodic testing and/or inspections;
using the computerized interface program to transfer to the computerized database the information read, recorded, and processed by said a least one second scanner from transponders installed on items of personal protective equipment relating to periodic testing and/or inspections; and
using the computer interface program to manually update the computerized database.

17. The method of claim 11 further comprising:
performing periodic testing and/or inspections of the personal protective equipment;
using said at least one second scanner to read, record, and process information from transponders installed on items of personal protective equipment relating to periodic testing and/or inspections;
using the computerized interface program to transfer to the computerized database the information read, recorded, and processed by a second scanner from transponders installed on items of personal protective equipment relating to periodic testing and/or inspections; and
using the computerized interface program to generate testing and/or inspection summaries and reports from the computerized database.

18. The method of claim 11 further comprising:
using said at least one second scanner to read information from transponders installed on items of personal protective equipment before the personal protective equipment can be used.

19. A method of organizing inspection records for items of personal protective equipment that require periodic testing and/or inspection using a computerized interface program, the inspection records obtained by a scanner that at least reads, records, and processes information stored on a plurality of transponders securely fastened on items of personal protective equipment, the inspection records further comprising information that is capable of being stored in a computerized database, said method comprising:
executing the interface program;
using the interface program to access information recorded by the scanner from the plurality of transponders securely fastened on items of personal protective equipment; and
using the interface program to access the database.

20. The method of claim 19 further comprising:
using the interface program to instruct a scanner to perform requested functions.

21. The method of claim 19 further comprising:
using the interface program to search the database.

22. The method of claim 19 further comprising:
using the interface program to make changes to information stored in the database.

23. The method of claim 19 further comprising:
using the interface program to generate reports on information stored in the database.

24. The method of claim 19 further comprising:
using the interface program as an inspection scheduling tool.

25. The method of claim 19 further comprising:
using the interface program as an equipment purchase planning tool.

26. The method of claim 19 further comprising:
using the interface program as an equipment usage planning tool.

27. A method of organizing personal protective equipment testing and/or inspection records comprising:
selecting a plurality of items of personal protective equipment that requires periodic testing and/or inspections;
selecting a plurality of transponders, each transponder having a read/write capability;
substantially permanently installing a transponder on items of personal protective equipment;
providing at least one scanner that can activate the transponders and read information from the activated transponders, record and process information received from the activated transponders, and electronically write information on the activated transponders;
providing a computerized database for storing and organizing information from transponders installed on items of personal protective equipment;
providing a computerized interface program that interfaces with at least one scanner and the computerized database to revise recorded information in the database and to program at least one scanner to read from and/or write to each transponder;
using at least one scanner to write in a read-only format appropriate initial information on transponders installed on items of personal protective equipment which identifies each item of personal protective equipment on which the transponder is installed and to write inspection information in a read/write format on transponders installed on items of personal protective equipment;
using the computerized interface program to input initial information to the computerized database from each transponder installed on each item of personal protective equipment;
performing periodic testing and/or inspections of the personal protective equipment;
using said at least one scanner to read, record, and process information from transponders installed on items of personal protective equipment relating to periodic testing and/or inspections;

using said at least one scanner to write information to transponders installed on items of personal protective equipment relating to periodic testing and/or inspections; and using the computerized interface program to transfer to the computerized database the information read, recorded, processed, and/or written by said at least one scanner from transponders installed on items of personal protective equipment during the periodic testing and/or inspections.

* * * * *